United States Patent
Dai et al.

(10) Patent No.: US 12,449,885 B2
(45) Date of Patent: Oct. 21, 2025

(54) PERIPHERAL DEVICE POWER

(71) Applicant: Hewlett-Packard Development Company, L.P., Spring, TX (US)

(72) Inventors: Fangyong Dai, Spring, TX (US); Anand Kulkarni, Spring, TX (US); Qijun Chen, Spring, TX (US); Asjad Shamim, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 14 days.

(21) Appl. No.: 18/262,705

(22) PCT Filed: Feb. 10, 2021

(86) PCT No.: PCT/US2021/017464
§ 371 (c)(1),
(2) Date: Jul. 24, 2023

(87) PCT Pub. No.: WO2022/173428
PCT Pub. Date: Aug. 18, 2022

(65) Prior Publication Data
US 2024/0393858 A1    Nov. 28, 2024

(51) Int. Cl.
*G06F 1/3234*    (2019.01)
*G06F 1/26*    (2006.01)
*G06F 1/3206*    (2019.01)

(52) U.S. Cl.
CPC .............. *G06F 1/325* (2013.01); *G06F 1/266* (2013.01); *G06F 1/3206* (2013.01)

(58) Field of Classification Search
CPC .......... G06F 1/325; G06F 1/266; G06F 1/3204
See application file for complete search history.

(56) References Cited

U.S. PATENT DOCUMENTS

| | | | |
|---|---|---|---|
| 8,830,073 | B2 | 9/2014 | Sims et al. |
| 9,477,288 | B2 | 10/2016 | Yang |
| 9,843,220 | B2 * | 12/2017 | Herrmann ......... H02J 7/007182 |
| 10,181,731 | B1 * | 1/2019 | Sultenfuss ......... H01R 13/6675 |
| 2017/0052578 | A1 * | 2/2017 | Agarwal ................ G06F 1/266 |
| 2017/0054310 | A1 | 2/2017 | Chen et al. |
| 2017/0140887 | A1 | 5/2017 | Waters |
| 2019/0171268 | A1 | 6/2019 | Ellis et al. |
| 2020/0067332 | A1 | 2/2020 | Kinoshita |

* cited by examiner

*Primary Examiner* — Terrell S Johnson
(74) *Attorney, Agent, or Firm* — Quarles & Brady LLP

(57) ABSTRACT

In one example in accordance with the present disclosure, an electronic device is described. An example electronic device includes a processor, a port to receive a connector of a peripheral device, and a power supply. An example power supply is to supply power to the processor and the peripheral device when connected to the electronic device. The example electronic device also includes an electronic device controller. The electronic device controller is to alter an amount of power from a first value to a second value to supply to the peripheral device based on an amount of power available from the power supply and a lower threshold power level that enables data communication from the peripheral device. The example electronic device also includes a power delivery controller. The power delivery controller is to provide the amount of power having the second value to the peripheral device based on an output from the electronic device controller.

15 Claims, 5 Drawing Sheets

PERIPHERAL DEVICE POWER

BACKGROUND

Electronic devices include ports which connect the electronic devices to peripheral devices which provide additional functionality to the electronic device. For example, a laptop computer may include ports through which speakers, display devices, and human interface devices such as keyboards and mouses may be coupled to the electronic device. While specific reference is made to particular peripheral devices, other peripheral devices may be coupled to the electronic device via the port. Other electronic devices such as tablets and desktop computers may also include ports to facilitate connection of peripheral devices to the electronic device.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
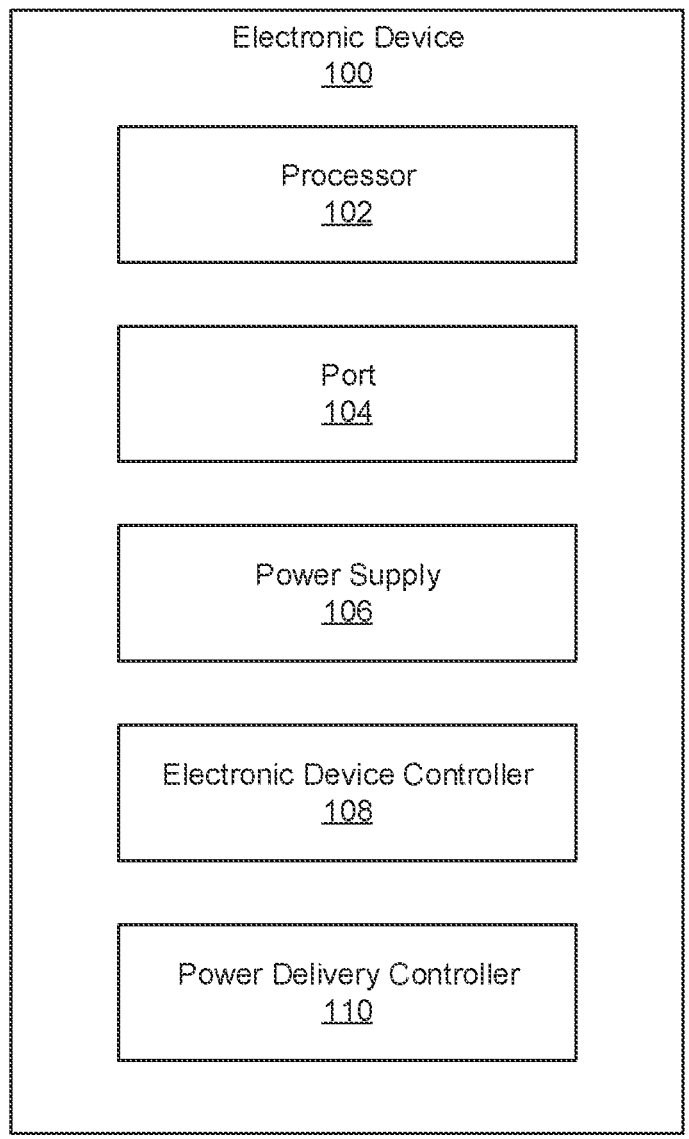
FIG. 1 is a block diagram of an electronic device to manage peripheral device power, according to an example.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Electronic devices include ports which allow peripheral devices to connect and provide additional functionality to the electronic device. For example, a laptop computer may include ports through which speakers, display devices, and human interface devices such as keyboards and mouses may be connected. Such ports provide a data connection between the electronic device and the peripheral device, such that the peripheral device may provide its intended functionality. For example, with a keyboard, data input at the keyboard may be presented on a display device of the electronic device. While specific reference is made to particular peripheral devices, other peripheral devices may be coupled to the electronic device via a port. Other electronic devices such as tablets and desktop computers may also include ports to facilitate connection of peripheral devices to the electronic device.

In some cases, in addition to providing data connectivity, the ports may establish a power connectivity. For example, via a universal serial bus (USB) type-C connection, a data path is established between the electronic device and the peripheral device. Through this USB type-C connection, the electronic device may also power the peripheral component. As a particular example, a mobile phone may be coupled to a computer via a USB type-C connection on the electronic device. Via this connection, data may be transferred between the computer and the mobile phone. Additionally, the mobile phone battery may be charged through this USB type-C connection.

In some cases, a peripheral device may request more power than is used to provide data connectivity. For example, a peripheral device may request additional power, which additional power is to charge an internal battery of the peripheral device. However, the power available at the electronic device to provide to the peripheral device may vary dynamically. For example, a laptop computer can provide more power when coupled to an electrical outlet supplying alternating current (AC) from a power grid as compared to when the laptop computer relies on its own internal direct current (DC) battery. Even when providing power from an internal battery, the amount of power available for supplication to a peripheral device may vary, for example, as the load on the battery changes and/or the battery level drains over time and use.

As described above, the amount of power requested by a peripheral device may exceed the amount of power the peripheral device uses to provide its data functionality. For example, when a mobile phone is connected to a computer, the computer may grant 15 watts (W) of power to the port, which provides the data connectivity and allows for charging the battery of the mobile phone. However, once the computer transitions to DC, that is when the computer is disconnected from an electrical outlet, the power supply may not be able to provide power at a 15 W level to the peripheral device without impacting the performance of the electronic device and/or the peripheral device. That is, if the computer continues to provide power blindly, the connection between the mobile phone and the computer may drop. Moreover, the performance of components and/or applications of the electronic device may be impacted. For example, the electronic device may include a processor that executes applications on the electronic device. Such a processor consumes power to execute the applications and if the power available from a power supply is below some threshold amount, the processor may not be able to effectively execute the application.

Accordingly, the present specification describes a device that negotiates a power contract when the power available changes, all while ensuring the peripheral device can provide its intended function. Returning to the example above, the electronic device may continue to provide power to enable a data connection, but may prevent the mobile phone from drawing additional power to charge its battery. Doing so may ensure that the peripheral device functions as intended while allowing the processor of the electronic device to efficiently handle its load.

Specifically, the present specification describes an electronic device. The electronic device includes a processor, a port to receive a connector of a peripheral device, and a power supply. The power supply supplies power to the processor and the peripheral device when connected to the electronic device. The electronic device also includes an electronic device controller to alter an amount of power from a first value to a second value to supply to the peripheral device based on 1) an amount of power available from the power supply and 2) a lower threshold power level that enables data communication from the peripheral device. The electronic device also includes a power delivery controller to provide the amount of power having the second value to the peripheral device based on an output from the electronic device controller. For example, when the amount of power available from a power supply changes based on the electronic device being decoupled from an electrical outlet of a power grid, the electronic device controller may alter an amount of power from a first value, such as 15 W to a second value, such as 2.5 W.

In another example, the electronic device includes a processor, a port to receive a connector of a peripheral device, and a power supply to provide power to 1) the processor of the electronic device and 2) the peripheral device when connected to the electronic device. In this example, the electronic device controller is to detect when the power supply switches between an alternating current (AC) mode and a direct current (DC) mode. Responsive to the power supply switching between the AC mode and the DC mode, the electronic device controller is to alter an amount of power to supply to the peripheral device while maintaining the amount of power supplied to the peripheral device above a lower threshold power level which enables data communication from the peripheral device. In this example, the electronic device includes the power delivery controller to provide power to the peripheral device based on an output from the electronic device controller.

The present specification also describes a non-transitory machine-readable storage medium where the term 'non-transitory' does not encompass transitory propagating signals. The non-transitory machine-readable storage medium includes instructions, when executed by the processor, cause the processor to 1) detect connection of a peripheral device at a port of an electronic device, 2) determine a difference between a requested power draw from the peripheral device and a lower threshold power level which enables data communication from the peripheral device, and 3) determine an amount of power available from a power supply of the electronic device. The instructions are also executable to cause the processor to 1) responsive to the amount of power available being greater than the requested power draw, provide an amount of power to the peripheral device at the requested power draw level and 2) responsive to the amount of power available being less than the requested power draw, provide an amount of power to the peripheral device at the lower threshold power level.

As used in the present specification and in the appended claims, the term, "controller" may be a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

Turning now to the figures, FIG. 1 is a block diagram of an electronic device 100 to manage peripheral device power, according to an example. The electronic device 100 may be of a variety of types including a desktop computer, a laptop computer, a tablet, a smart phone, or any of a variety of other electronic device 100 that includes ports 104 to receive connectors of peripheral devices.

The electronic device 100 includes a processor 102. The processor 102 is to execute any number of applications on the electronic device 100. For example, the processor 102 may be a central processing unit (CPU) that executes instructions to run applications on the electronic device 100.

The electronic device 100 also includes at least one port 104 to receive a connector of a peripheral device. As described above, peripheral devices provide additional functionality to the electronic device 100. In some examples, the peripheral device may be a human interaction device such as a microphone, keyboard, or mouse. In other examples, the peripheral device may be an electronic device with its own processor. For example, the peripheral device may be a mobile phone that is connected to the electronic device 100 via the port 104. Through the port 104, the electronic device 100 and mobile phone may transmit data.

In addition to transmitting data, some ports 104 may facilitate power transfer as well. For example, the port 104 may be a USB type-C port 104 which transmits both data and power through a single cable. Accordingly, a peripheral device connected via a USB type-C port 104 has a data connection with the electronic device 100 and may also sink power from the power supply 106 of the electronic device 100, for example to charge an internal battery of the peripheral device.

The electronic device 100 also includes a power supply 106 which provides power to 1) the processor 102 of the electronic device 100 and 2) any peripheral device that is connected to the electronic device 100. At different points in time, the power supply 106 may be in a variety of modes. IN different modes, the power supply 106 may have a different capacity of power available for dispersion to the processor 102 and peripheral devices. For example, the electronic device 100 may be coupled to an electrical outlet of a power grid, in which case the power supply 106 is in an alternating current (AC) mode with an infinite amount of power available.

By comparison, when disconnected from the electrical outlet, the power supply 106 may be in a DC mode where power is supplied entirely by the internal battery. When running off an internal battery, the amount of power available for peripheral devices may be finite. As such, the power supply 106 may have a reduced capacity to provide power to the processor 102 and peripheral devices.

However, regardless of the mode of the power supply 106, the peripheral device may draw the same amount of power. For example, a USB type-C port 104 may provide up to 15 W of power to a peripheral device. Accordingly, a peripheral device may request a full 15 W of power, even if the peripheral device draws less than 15 W to provide a data connection. Rather, these peripheral devices request the full 15 W to perform surplus operations, for example to charge their internal batteries. While in AC mode, this may not present an issue due to the infinite amount of power available through the power grid. However, when the power supply 106 transitions to a DC mode, i.e., disconnects from a power grid, the performance of the electronic device 100 and/or the peripheral device may be affected if the peripheral device is still provided the full 15 W of power.

Accordingly, the electronic device 100 rebalances the power provided to the ports 104 as the power available from the power supply 106 changes, such as when transitioning from AC mode to DC mode. Otherwise, the electronic device 100 performance may be impacted and may even shutdown.

Accordingly, the electronic device 100 calculates a degree to which power supplied to the peripheral devices may be changed without affecting the peripheral device functional operation. Specifically, the electronic device 100 determines a power discrepancy between 1) a requested power draw level and/or a measured power level and 2) a lower threshold level, which lower threshold level refers to an amount of power to provide through the port 104 to maintain data connectivity. This difference is considered unrelated to functional operation and may be used for device supplemental operations, such as battery charging. This surplus amount may be the amount by which the power provided to the peripheral device is reduced. As such, the electronic device ensures functionality of the electronic device 100 and the peripheral devices.

To accomplish this power management, the electronic device 100 includes various controllers. Specifically, the electronic device 100 includes an electronic device controller 108. In general, the electronic device controller 108 manages the amount of power to supply to the peripheral device. This may be done by altering an amount of power to supply to the peripheral device from a first value to a second value. Specifically, the electronic device controller 108 determines 1) how much power is available from the power supply 106 and 2) how much power should be provided to the peripheral device to ensure peripheral functionality. The electronic device controller 108 then instructs the power delivery controller 110 to provide the amount of power having the second value to the peripheral device via the port 104.

Specifically, the electronic device controller 108 may determine an amount of power available from the power supply 106. This value may be dynamic and change over time. The amount of power available may be dependent upon a number of factors. For example, the electronic device controller 108 may determine the amount of power available based on a power supply type. For example, different electronic device batteries may have different types and quantities of power cells that impact how much overall power is available for use by the electronic device 100 and any connected peripheral devices. Accordingly, the electronic device controller 108 may communicate with a battery controller/monitor to determine a type of power supply 106.

Another factor that defines the amount of available power is a power supply 106 level. That is, with a power supply such as a battery, the electronic device 100 and peripheral devices draw power, such that the amount of power available reduces over time, until the battery is recharged. The different power supply levels impact the amount of power available from the power supply 106. Accordingly, the electronic device controller 108 may communicate with a monitor to determine a level of the power supply 106.

Another defining factor is whether the electronic device 100 is in an AC mode, i.e., connected to an external power grid or in a DC mode. That is, the electronic device controller 108 may communicate with another controller to determine whether the power supply 106 is supplying power from an AC source, i.e., it is connected to a power grid via a cable coupled to a power outlet, or whether the power supply 106 is suppling power from a DC source, i.e., it is running of an internal battery.

Another factor that impacts the amount of power available at the power supply 106 is the nature and quantity of applications executing on the electronic device 100. That is, to execute an application, the processor 102 consumes a certain amount of power. Accordingly, as more applications are being executed, more power is drawn by the processor 102 to execute these applications. Moreover, different types of applications may necessitate a higher power draw by the processor 102. As a particular example, a spreadsheet application may not necessitate a high processor load as compared to a video rendering application. Accordingly, the electronic device controller 108 may determine an application load on the processor 102.

Another factor impacting the amount of power available, is a quantity of peripheral devices connected to the electronic device 100. As described above, to perform a particular data function, a peripheral device may draw a certain amount of power from the power supply 106. The quantity and type of peripheral devices alter the amount of power drawn, with more peripheral devices drawing more power, such that less is available to the peripheral devices. Moreover, certain types of peripheral devices may draw more power. For example, a passive external memory device may draw less power, or no power at all, as compared to a mobile phone that may draw more power for data transfer and syncing.

In summary, there are many factors that determine the amount of power available from a power supply. In an example, the electronic device controller 108 determines the amount of power available from the power supply based on a power supply type, a power supply level, a connection to external alternating current (AC) power, an application executing on the electronic device, a quantity of peripheral devices connected to the electronic device, or a combination thereof.

This determination by the electronic device controller 108 may be dynamic. That is, in addition to determining an amount of power available at the power supply 106, the electronic device controller 108 may determine a change to the amount of power available from the power supply 106. As a particular example, the electronic device controller 108 may determine when the power supply 106 switches between AC mode and DC mode.

The electronic device controller 108 may make such a determination by periodically polling the power supply 106, detecting a status change of the power supply 106, or combinations thereof. For example, the electronic device controller 108 may poll, every few seconds, the power level of the power supply 106. In another example, the electronic device controller 108 may detect a change in the system, such as the electronic device 100 being decoupled form the power grid, a new application being executed, and a change to the status of the battery load. In this example, the electronic device controller 108 may be coupled to any number of components of the electronic device 100 such as the processor 102, power supply 106, and/or other controllers of the electronic device 100 to receive signals indicative of the changed status.

In addition to determining the amount of power available at the power supply 106 for supplication to the peripheral devices, the electronic device controller 108 also determines a lower threshold power level for the port and peripheral device. This lower threshold power level is a power level that enables data communication from the peripheral device, but that is not intended to support surplus power-consuming operations, such as charging an internal battery. That is, as described above, it may be the case that regardless of what a peripheral device uses for a data connection, the peripheral device may request a power draw higher than that amount. As a particular example, the USB specification may indicate that a USB type-C port 104 can provide up to 15 W of power. Even though a particular peripheral device may use some value less than that, for example 2.5 W on a USB 2.0 connection, to establish a data connection, the peripheral device may request the full 15 W of power, for example to provide a charge to an internal battery of the peripheral device.

Knowing this lower threshold power level to enable just a data connection, the electronic device controller 108 may alter the amount of power delivered to the peripheral device, thus reducing the overall power consumed by the electronic device 100 components and the peripheral device. Reducing this overall power consumption results in a more effective use of finite power that is available from the power supply 106 in certain circumstances, such as when the electronic device 100 is powered just by its own internal battery.

Such a determination of the lower threshold power level may be based on a communication protocol utilized across the port 104. For example, a USB type-C port 104 may facilitate different types of connections across it. For example, the communication protocol of the USB type-C port may be a USB 2.0 protocol, USB 3.0 protocol, USB 3.x protocol, THUNDERBOLT protocol, Display Port protocol, and Audio Port protocol. Each of these may be associated with a power level which would result in a data communication being ensured across the port 104. Table 1 below provides example power levels that would ensure data communication across the port 104.

TABLE 1

| Communication Protocol | Power to ensure data connection (W) |
| --- | --- |
| USB 2.0 | 2.5 W |
| USB 3.0 | 4.5 W |
| USB 3.x | 7.5 W |
| Thunderbolt | 15 W |
| Display Port | 2.5 W |
| Audio Port | 2.5 W |

As clearly demonstrated from Table 1, there may be a difference between 1) a requested draw, which may be the full power allowed via the port 104 specification, and 2) what is used to ensure data connection. The difference between these two numbers represents an amount by which the electronic device controller 108 may reduce power distributed to conserve overall power use. Conserving overall power consumption may prolong the use of peripheral devices and the electronic device 100 in general when there is a finite amount of power available, such as when the electronic device 100 is operating on its own internal battery.

In other words, in this example, the electronic device controller 108 is to determine a surplus power value for the peripheral device, which surplus power value is a difference between a requested draw from the peripheral device and the lower threshold power level and reduces the amount of power to supply to the peripheral device by the surplus power value when the power available from the power supply 106 is exceeded by the requested draw.

In some cases, the reduction in power supplied is responsive to a change in the amount of power available from the power supply 106. That is, responsive to a detected change in the amount of power available from the power supply 106, the electronic device controller 108 is to change the amount of power supplied to the peripheral device, all while maintaining the amount of power supplied to the peripheral device above the lower threshold power level to ensure a data connection and peripheral functionality.

As a specific example, responsive to the power supply 106 switching between an AC mode to a DC mode, the electronic device controller 108 may alter the amount of power to supply to the peripheral device above this lower threshold power level. Such alterations may be made based on any number of detected changes. For example, responsive to the power supply switching from an AC mode to a DC mode, the electronic device controller 108 may instruct the power delivery controller 110 to supply the amount of power to the peripheral device at the lower threshold power level. In this case, the electronic device controller 108 may prevent the peripheral device from drawing power to charge an internal battery of the peripheral device. By comparison, responsive to the power supply 106 switching from the DC mode to the AC mode, the power delivery controller 110 may instruct the power delivery controller 110 to supply the amount of power to the peripheral device at the peripheral device requested draw level.

Determining the communication protocol may be performed by the power delivery controller 110. That is, once a peripheral device is connected to the electronic device 100, the power delivery controller 110 may determine which of the communication protocols indicated in Table 1 is being utilized. Via this connection, the power delivery controller 110 may also determine a requested draw amount by the peripheral device. Based on this information as well as database entries indicating lower threshold power levels associated with each communication protocol, the electronic device controller 108 may determine by what amount to reduce the power delivered to the peripheral device. The electronic device controller 108 then passes this indicated amount to the power delivery controller 110, and the power delivery controller 110 provides power to the peripheral device based on the output from the electronic device controller 108. That is, the power delivery controller 110 is the component of the electronic device 100, that couples and regulates power delivery from the power supply 106 to the port 104 with a peripheral device coupled thereto. Examples of how the power delivery controller 110 makes a determination of the communication protocol used and/or the power draw requested are provided below in connection with FIG. 4.

Accordingly, the electronic device 100 includes a power delivery controller 110 to monitor the port 104 and determine its communication protocol. Based on information collected throughout the electronic device 100, the electronic device controller 108 may intelligently calculate a surplus amount of power. For example, when going from an AC mode to a DC mode, the electronic device controller 108 may adjust the amount of power supplied to the peripheral devices all while ensuring peripheral functionality is maintained. That is, if one USB type-C port 104 is consuming more than the amount indicated in Table 1 for the associated communication protocol, the electronic device controller 108 may prevent the supplemental operations, i.e., battery charging. So, the electronic device controller 108 reduces surplus load on the power supply 106. Similarly, when the electronic device 100 is put into AC mode where power capability increases, the electronic device controller 108 may increase the power, so that additional surplus power flowing into attached Type-C device is provided to support the supplemental operations.

A few examples of altering the amount of power from a first value to a second value are now provided. In a first example, the electronic device controller 108 may determine that a communication protocol across a port 104 is a USB 3.0 protocol which has a lower threshold power level of 4.5 W. In this example, the electronic device 100 electrical cable may be removed from an electrical outlet of a power grid, such that the electronic device 100 is powered by an internal battery. Accordingly, the amount of power available changes such that the electronic device controller 108 may alter an amount of power from a first value, such as 15 W to a second value, such as 4.5 W.

In another example, the electronic device controller 108 may determine that a communication protocol across a port 104 is a USB 2.0 protocol which has a lower threshold power level of 2.5 W. In this example, the electronic device 100 may be disconnected from an electrical outlet of a power grid, but may have a full charge such that the power delivery controller 110 may provide power at the full requested amount. Over time, the battery level may fall such that the amount of power available decreases. In this example, the electronic device controller 108 may alter an amount of power from a first value, such as 15 W to a second value, such as 2.5 W or some intermediate value based on the power supply level.

Figure 2:
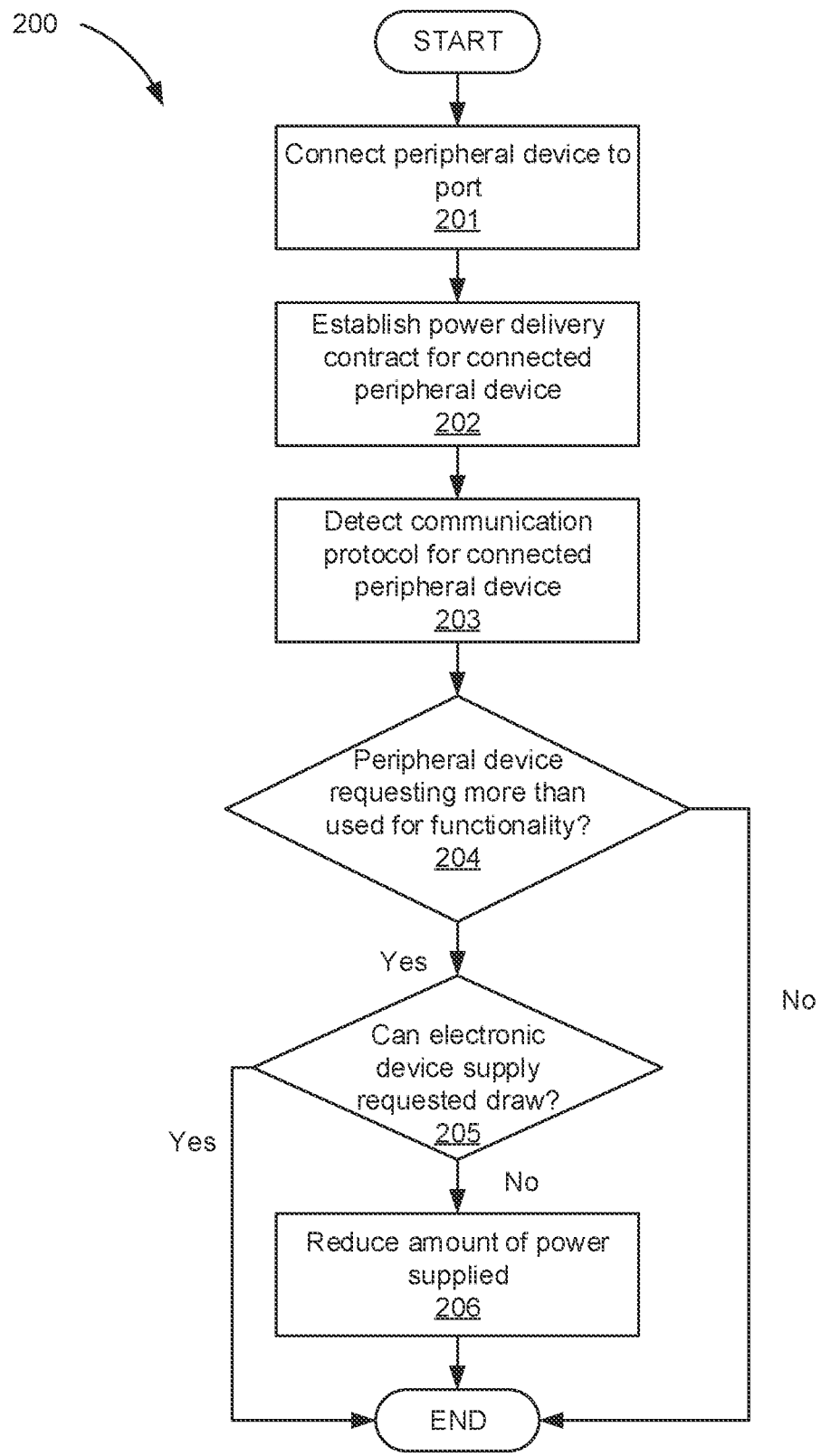
FIG. 2 is a flowchart of a method for managing peripheral device power, according to an example.

FIG. 2 is a flowchart of a method 200 for managing peripheral device power, according to an example. At step 201, the method 200 includes connecting a peripheral device to a port 104. As described above, the port 104 may allow for connection of a peripheral device to an electronic device 100 and to provide additional functionality to the electronic device 100. The port 104 may facilitate data and power connection and connection of the peripheral device to the port 104 may be detected by a component of the electronic device 100, such as the power delivery controller 110 or another controller.

At step 202, the method 200 includes establishing a power delivery contract for the connected peripheral device. A power delivery contract is a result of a negotiation between the electronic device 100 and the peripheral device regarding how much power is to be consumed by the peripheral device. In an example, when a peripheral device connects, the electronic device 100 advertises via data packets a highest amount of power the power supply 106 is able to provide. Responsive to this advertisement, the peripheral device may request a draw of power. For example, the electronic device 100 may advertise that it can provide 3 amps of current at 5 volts resulting in 15 W of power. The peripheral device may respond requesting a draw of 7.5 W of power or some other amount. Provided the power supply 106 can accommodate, the electronic device 100 provides power at that level.

At step 203, the method 200 includes detecting which of the different communication protocols are implemented across the port 104. For example, again via packet communication, the peripheral device may indicate which of the communication protocols indicated in Table 1 are in use.

With information regarding a communication protocol, a requested draw, and information regarding a load on the power supply 106 from the electronic device 100 and its components, the electronic device controller 108 may manage power delivery to the peripheral device. For example, at step 204, the method 200 includes determining whether the peripheral device is drawing, or requesting, more power than used to provide its functionality. As described above, such a determination may be made based on the lower threshold power level for a particular communication protocol as identified in Table 1. If the peripheral device is not drawing more power than suggested to provide a data connection, 204 determination NO, the method 200 may end and the electronic device controller 108 and power delivery controller 110 may provide power at that amount.

By comparison, if the peripheral device is drawing more power than the lower threshold power level, 204 determination YES, at step 205, the method includes determining if the power supply 106 can provide the requested draw. For example, if the internal battery has sufficient capacity and/or the electronic device 100 is connected to a power grid electrical outlet, then the power supply 106 may have sufficient capacity to provide power at a requested rate. Other factors indicative of whether the power supply 106 is able to provide power at the requested level include 1) a type of battery, 2) an application load on the processor 102, and 3) a number of peripheral devices connected to respective ports 104. If the power supply 106 is able to provide the requested level of power, 205 determination YES, the method 200 ends and the electronic device controller 108 and the power delivery controller 110 may provide power at the requested draw level.

By comparison, if the power supply 106 is not able to provide the requested level of power, 205 determination NO, at step 206, the method 200 includes reducing the amount of power supplied. Specifically, the electronic device controller 108 may instruct the power delivery controller 110 to provide power at the lower threshold power level, thus ensuring continued peripheral functionality notwithstanding the finite amount of power available from the power supply 106.

Figure 3:
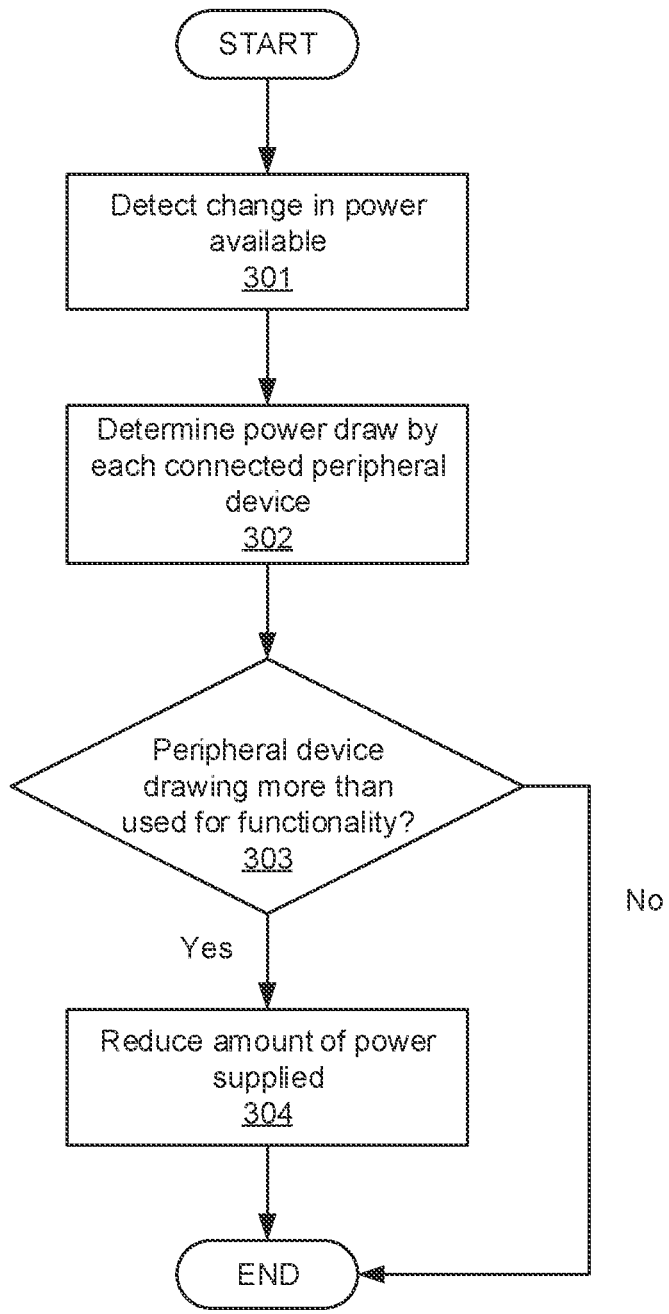
FIG. 3 is a flowchart of a method for managing peripheral device power, according to an example.

FIG. 3 is a flowchart of a method 300 for managing peripheral device power, according to an example. In this example, at step 301, the method 300 includes detecting a change in power available from the power supply 106. For example, the electronic device controller 108 may detect a transition from AC mode to DC mode, a change in the battery level, a change in the application load on the processor 102, and/or a change to the peripheral devices connected to the electronic device 100. In this example, at step 302, the method 300 includes determining a power draw by a connected peripheral device.

Similar to above, at step 303, the method 300 may include determining if the peripheral device is drawing more power than used to provide its functionality. In an example, the electronic device 100 may include a database that maps communication protocols to lower threshold power levels, such that upon detecting a communication protocol, the electronic device controller 108 may ascertain the lower threshold power level. When the peripheral device is drawing more power than the lower threshold power level, 303 determination YES, at step 304, the method 300 includes reducing the amount of power supplied to the peripheral device as described above in connection with FIG. 2. When the peripheral device is not drawing more power than the lower threshold power level, 303 determination NO, the method 300 may end and the electronic device controller 108 and power delivery controller 110 may continue to provide power at the drawn level.

Figure 4:
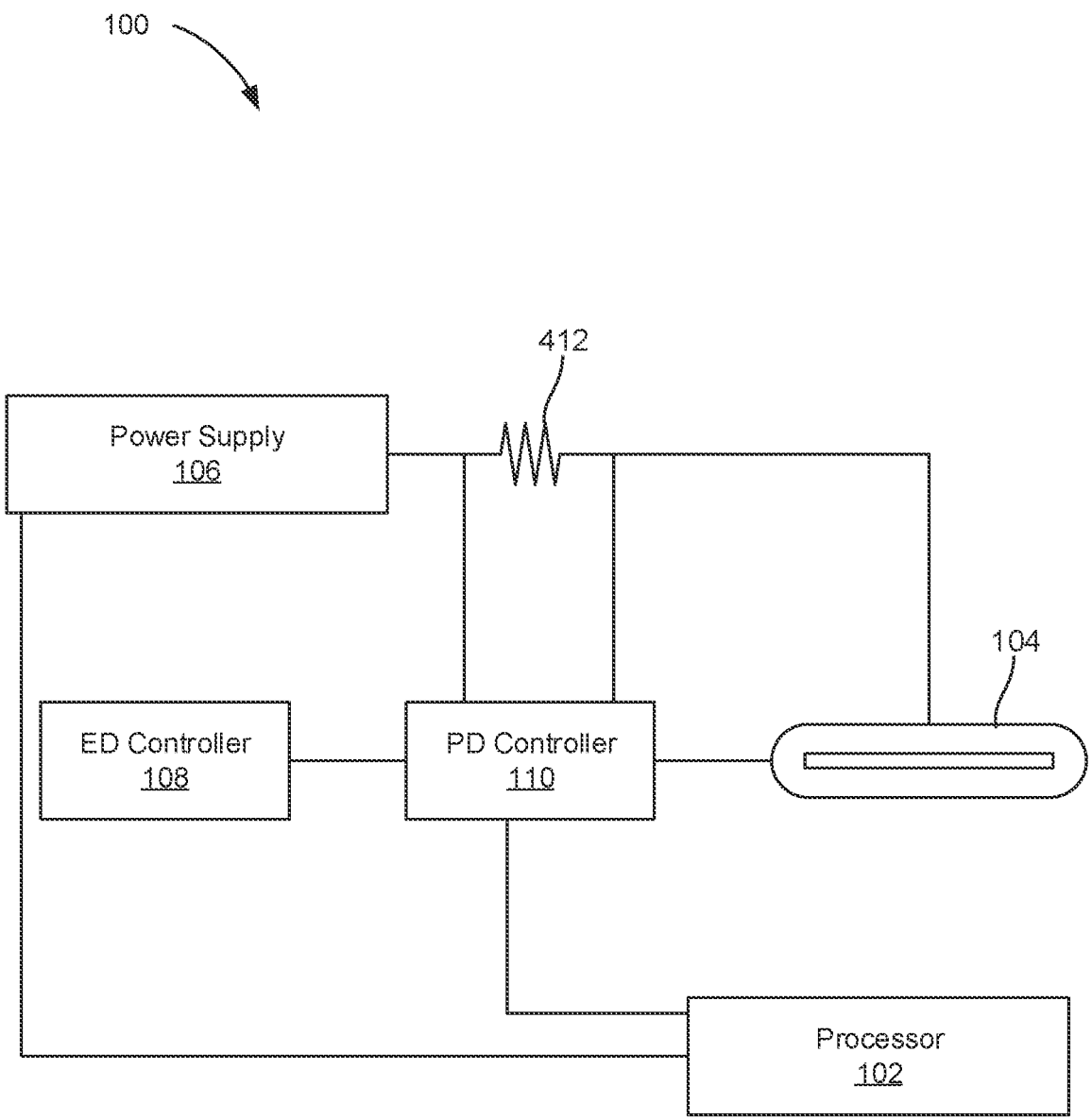
FIG. 4 is a diagram of an electronic device to manage peripheral device power, according to an example.

FIG. 4 is a diagram of an electronic device 100 to manage peripheral device power, according to an example. As mentioned above, in some examples, a peripheral device may include logic to allow communication to the electronic device 100 of information such as communication protocol, etc. to determine the lower threshold power level. In this example, the electronic device controller 108 is to determine the type of communication protocol based on data packet exchange between the electronic device 100 and the peripheral device.

Accordingly, during the determination, the port 104 receives a connector of a peripheral device via a USB type C port 104. Via the power delivery controller 110, the electronic device controller 108 determines the communication protocol, such as USB 2.0, USB 3.0, Thunderbolt, etc. From a number of other processors on the electronic device 100, the electronic device controller 108 determines an amount of power available from the power supply 106. The electronic device controller 108 then instructs the power delivery controller 110 to provide power to the port 104 and the processor 102 accordingly. When the power available changes, for example, when the electronic device 100 switches to battery power, the electronic device controller 108 may change the amount of power supplied to the peripheral device based on the communication protocol.

In some examples, the electronic device 100 may include a sense resistor 412 to measure the actual power consumed on a port 104. In this example, the power delivery controller 110 may be aware of any difference between 1) a requested amount of power, or a power contract value, and 2) a lower power level threshold. For example, the power delivery controller 110 may measure two voltages across the ends of the sense resistor 412. From these values, the power delivery controller 110 may calculate the port power as the absolute voltage level multiplied by the voltage difference between the two ends of the sense resistor 412 divided by the sense resistor 412 value. That is, the port power=absolute voltage level×(voltage delta between ends of sense resistor/sense resistor value). The power delivery controller 110 may compare the measured port power with its contracted power to identify the delta. If the delta is past a threshold level, the power delivery controller 110 may operate to reduce the power provided to the peripheral device.

As described above, in some examples the peripheral device has logic to transfer data packets that indicate a communication protocol to the electronic device 100. In other examples, the peripheral device may not have such logic. Examples of such devices include a USB fan, USB light, and a USB external memory device.

In this example, the peripheral device may include a communication channel pin on the connector. Accordingly, once a peripheral device connects to the port 104, this communication channel pin is also electronically connected to the power delivery controller 110. In this example, the power delivery controller 110 senses a resistance between the communication channel pin and ground and applies an initial power. At a later point in time, the power delivery controller 110 starts communication via the communication channel pin to establish a final power contract and interface.

On such a peripheral device without protocol-indicating logic, the protocol is determined according to another example. In this example, the communication channel pin and a USB 2.0 pair may be active, signals of which are both routed to the power delivery controller 110. In other words, a peripheral device without protocol-indicating logic has two states for the protocol, none or USB 2.0. Accordingly, by knowing if the connection is active, the power delivery controller 110 can determine the protocol, i.e., USB 2.0. As such, the electronic device controller 108 may determine the lower power threshold amount, for example from Table 1, which may be included in a database on the electronic device 100.

Figure 5:
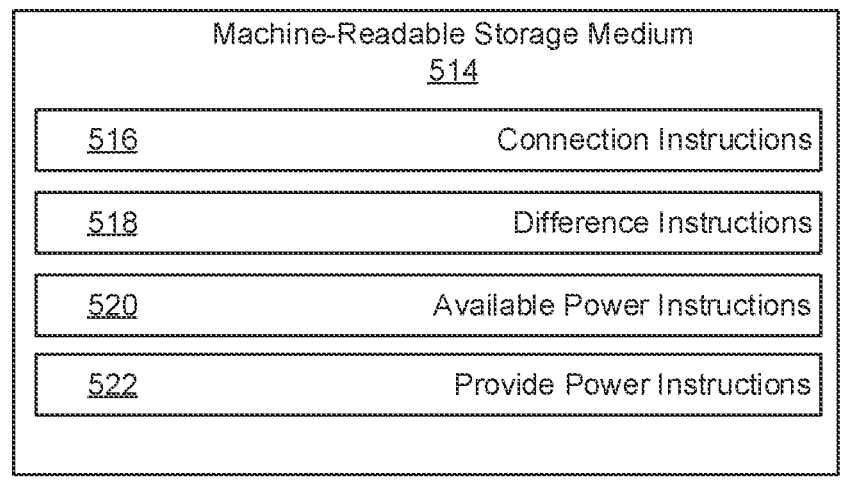
FIG. 5 depicts a non-transitory machine-readable storage medium for managing peripheral device power, according to an example.

FIG. 5 depicts a non-transitory machine-readable storage medium for managing peripheral device power, according to an example. To achieve its desired functionality, an electronic device 100 includes various hardware components. Specifically, an electronic device 100 includes a processor 102 and a machine-readable storage medium 514. The machine-readable storage medium 514 is communicatively coupled to the processor 102. The machine-readable storage medium 514 includes a number of instructions 516, 518, 520, 522 for performing a designated function. The machine-readable storage medium 514 causes the processor to execute the designated function of the instructions 516, 518, 520, 522. The machine-readable storage medium 514 can store data, programs, instructions, or any other machine-readable data that can be utilized to operate the electronic device 100. Machine-readable storage medium 514 can store computer readable instructions that the processor of the electronic device 100 can process, or execute. The machine-readable storage medium 514 can be an electronic, magnetic, optical, or other physical storage device that contains or stores executable instructions. Machine-readable storage medium 514 may be, for example, Random Access Memory (RAM), an Electrically Erasable Programmable Read-Only Memory (EEPROM), a storage device, an optical disc, etc. The machine-readable storage medium 514 may be a non-transitory machine-readable storage medium 514, where the term "non-transitory" does not encompass transitory propagating signals.

Referring to FIG. 5, connection instructions 516, when executed by the processor, cause the processor to, detect connection of a peripheral device at a port 104 of an electronic device 100. Difference instructions 518, when executed by the processor, may cause the processor to, determine a difference between a requested power draw from a peripheral device and a lower threshold power level which enables data communication from the peripheral device. Available power instructions 520, when executed by the processor, may cause the processor to, determine an amount of power available from a power supply 106 of the electronic device 100. Provide power instructions 522, when executed by the processor, may cause the processor to, responsive to the amount of power available being greater than the requested power draw, provide an amount of power to the peripheral device at the requested draw level. Responsive to the amount of power available being less than the requested power draw, provide power instructions 522, when executed by the processor, may cause the processor to, provide an amount of power to the peripheral device at the lower threshold power level.

What is claimed is:

1. An electronic device, comprising:
  a processor;
  a port to receive a connector of a peripheral device;
  a power supply to supply power to:
    the processor; and
    the peripheral device when connected to the electronic device;
  an electronic device controller to generate an output for altering an amount of power supplied to the peripheral device based at least in part on:
    power available from the power supply; or
    a lower threshold power level that enables data communication from the peripheral device; and
  a power delivery controller to alter and supply the amount of power to the peripheral device based at least in part on the output from the electronic device controller,
  wherein the power delivery controller is to:
    measure the amount of power supplied to the peripheral device;
    determine that a difference between the amount of power supplied to the peripheral device and a requested power draw from the peripheral device exceeds a positive threshold;
    in response to determining that the difference exceeds the positive threshold, reduce the amount of power supplied to the peripheral device based at least in part on the difference.

2. The electronic device of claim 1, wherein the electronic device controller is to determine the lower threshold power level based on a communication protocol utilized across the port.

3. The electronic device of claim 1, wherein the electronic device controller is to determine the amount of power available from the power supply based on:
a power supply type,
a power supply level,
a connection to external alternating current (AC) power,
an application executing on the electronic device,
a quantity of peripheral devices connected to the electronic device, or a combination thereof.

4. The electronic device of claim 1, wherein the electronic device controller is to determine a change to the amount of power available from the power supply.

5. The electronic device of claim 4, wherein, responsive to a change in the amount of power available from the power supply, the electronic device controller is to change the amount of power supplied to the peripheral device while maintaining the amount of power supplied to the peripheral device above the lower threshold power level.

6. The electronic device of claim 4, wherein the electronic device controller is to determine a change to the amount of power available from the power supply by periodically polling the power supply, detecting a status change of the power supply, or a combination thereof.

7. The electronic device of claim 1, wherein the port is a universal serial bus (USB) type-C port.

8. The electronic device of claim 1, wherein in response to determining that the difference exceeds the positive threshold, the power delivery controller is to:
reduce the amount of power to the lower threshold power level when the output indicates that the power supply is in a direct current (DC) mode; or
reduce the amount of power to the requested power drawn when the output indicates that the power supply is in an alternating current (AC) mode.

9. An electronic device, comprising:
a port to receive a connector of a peripheral device;
a power supply to provide power to:
a processor of the electronic device; and
the peripheral device when connected to the electronic device;
an electronic device controller to:
detect when the power supply switches between an alternating current (AC) mode and direct current (DC) mode; and
responsive to the power supply switching between AC mode and DC mode, alter an amount of power from a first value to a second value to supply to the peripheral device while maintaining the amount of power supplied to the peripheral device above a lower threshold power level which enables data communication from the peripheral device; and
a power delivery controller to:
measure the amount of power supplied to the peripheral device;
determine that a difference between the amount of power supplied to the peripheral device and a requested power draw from the peripheral device exceeds a positive threshold;
in response to determining that the difference exceeds the positive threshold, reduce the amount of power supplied to the peripheral device based at least in part on the difference.

10. The electronic device of claim 9, wherein the electronic device controller is to determine a type of communication protocol based on data packet exchange between the electronic device and the peripheral device.

11. The electronic device of claim 9, wherein, responsive to the power supply switching from AC mode to DC mode, the power delivery controller is to supply the amount of power to the peripheral device at the lower threshold power level.

12. The electronic device of claim 9, wherein, responsive to a power supply switching from DC mode to AC mode, the power delivery controller is to supply the amount of power to the peripheral device at a requested draw level for the peripheral device.

13. The electronic device of claim 9, wherein the electronic device controller prevents the peripheral device from drawing power to charge a battery of the peripheral device.

14. A non-transitory machine-readable storage medium encoded with instructions executable by a processor of an electronic device, when executed by the processor, cause the processor to:
detect connection of a peripheral device at a port of an electronic device;
determine a difference between a requested power draw from the peripheral device and a lower threshold power level which enables data communication from the peripheral device;
determine an amount of power available from a power supply of the electronic device;
responsive to the amount of power available being greater than the requested power draw, provide an amount of power to the peripheral device based on the requested power draw;
responsive to the amount of power available being less than the requested power draw, provide the amount of power to the peripheral device at the lower threshold power level;
measure the amount of power supplied to the peripheral device;
determine that a difference between the amount of power supplied to the peripheral device and a requested power draw from the peripheral device exceeds a positive threshold; and
in response to determining that the difference exceeds the positive threshold, reduce the amount of power supplied to the peripheral device based at least in part on the difference.

15. The non-transitory machine-readable storage medium of claim 14, wherein:
the non-transitory machine-readable storage medium further comprises instructions to, determine the lower threshold power level based on a communication protocol used across the port; and
the communication protocol is selected from the group consisting of:
universal serial bus (USB) 2.0;
USB 3.0;
USB 3.x;
Thunderbolt;
Display Port; and
Audio Port.

* * * * *